United States Patent [19]

Brunelle et al.

[11] Patent Number: 4,757,132
[45] Date of Patent: Jul. 12, 1988

[54] CYCLIC POLYESTER OLIGOMER POLYMERIZATION

[75] Inventors: Daniel J. Brunelle, Scotia; Thomas G. Shannon, Schenectady, both of N.Y.

[73] Assignee: General Electric Company, Schenectady, N.Y.

[21] Appl. No.: 920,540

[22] Filed: Oct. 20, 1986

[51] Int. Cl.[4] .............................................. C08G 63/00
[52] U.S. Cl. .................................. 528/357; 528/176; 528/182; 528/190; 528/272; 528/274; 528/279; 528/298; 528/355; 528/370; 528/371; 549/264; 549/267; 549/268; 549/269
[58] Field of Search ............... 528/176, 182, 190, 272, 528/298, 371, 370, 274, 279, 357, 355; 549/267, 264, 268, 269

[56] References Cited

FOREIGN PATENT DOCUMENTS 7121873 6/1971 Japan .

OTHER PUBLICATIONS

Wick et al., *Angew. Makromol. Chem.*, 112, 59-94, (1983).

*Primary Examiner*—Harold D. Anderson
*Attorney, Agent, or Firm*—William H. Pittman; James C. Davis, Jr.; James Magee, Jr.

[57] ABSTRACT

Cyclic polyester and especially polyarylate oligomers, typically having degrees of polymerization from 2 to about 7, are prepared by reacting a bisphenol such as bisphenol A or 6,6'-dihydroxy-3,3,3',3'-tetramethyl-spiro(bis)indane with a dicarboxylic acid chloride such as isophthaloyl or terephthaloyl chloride in the presence of a catalyst, under conditions of low concentration. The cyclic oligomers may be polymerized to linear polyesters by contact with a transesterification catalyst at a temperature in the range of about 200°-300° C.

9 Claims, No Drawings

CYCLIC POLYESTER OLIGOMER POLYMERIZATION

This invention relates to the preparation of polyarylates and similar polyesters, and to intermediates useful for conversion thereto.

Polyarylates are a class of polyesters characterized by high solvent resistance and thermal stability, as a result of their high degree of crystallinity. They are typically prepared by the reaction of a bisphenol with an aromatic dicarboxylic acid or functional derivative thereof. Another class of polyacrylates, linear polyester-polycarbonates, is typically prepared by the incorporation of an aromatic dicarboxylic acid chloride in an interfacial reaction mixture including a bisphenol salt and phosgene. Other structurally similar polyesters may be prepared from bisphenols and aliphatic dicarboxylic acids.

A recent innovation in linear polycarbonate preparation involves the use of cyclic polycarbonate oligomer mixtures as intermediates. Such oligomer mixtures, disclosed in European Patent Application No. 162,379 and in copending, commonly owned application Ser. No. 704,122, filed Feb. 22, 1985, now U.S. Pat. No. 4,644,053 are readily convertible under very favorable conditions to linear polycarbonates of very high molecular weight.

It has become of interest to develop intermediates for the preparation of polyacrylates and similar polyesters which are analogous to the cyclic polycarbonate oligomers useful in linear polycarbonate preparation. Such intermediates have potential for conversion to linear polyesters, and also to random and block copolyesters as exemplified by the aforementioned polyester-polycarbonates.

The present invention provides a class of novel cyclic polyester oligomers and methods for their preparation. Said method involves readily available starting materials and is relatively simple to achieve. The invention also includes a method for converting said cyclic polyester oligomers to high molecular weight linear polyesters.

In one of its aspects, the invention is directed to compositions comprising cyclic polyester oligomers containing structural units of the formula

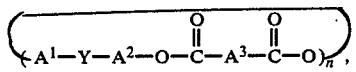

(I)

wherein each of $A^1$ and $A^2$ is a monocyclic divalent or trivalent aromatic radical, $A^3$ is a divalent aliphatic or m- or p-linked monocyclic aromatic or alicyclic radical, Y is a single bond or a divalent, trivalent or tetravalent bridging group and n is from 2 to about 7.

The $A^1$ and $A^2$ values in formula I are monocyclic aromatic radicals which are usually unsubstituted but may be substituted with such groups as alkyl, alkenyl, halo (especially chloro and/or bromo), nitro, alkoxy and the like. They may be divalent or trivalent, depending on the structure of of the Y value as defined hereinafter. The preferred radicals are those containing a p-phenylene configuration; that is, p-phenylene or substituted p-phenylene radicals which optionally contain an additional free valence bond.

The Y value may be a single bond or a divalent, trivalent or tetravalent bridging group. Depending on the valence thereof, $A^1$ and $A^2$ will then both be divalent, one divalent and the other trivalent, or both trivalent. Most often, Y is a divalent or tetravalent bridging group.

Thus, the compositions of this invention may be considered as being derived from bisphenols of the formula

(II)

The following bisphenols are illustrative.
4,4'-Dihydroxybiphenyl
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3,5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl)ether
Bis(4-hydroxyphenyl)ether
Bis(4-hydroxyphenyl)sulfide
Bis(4-hydroxyphenyl)sulfoxide
Bis(4-hydroxyphenyl)sulfone
Bis(3,5-dimethyl-4-hydroxyphenyl)sulfone
9,9-Bis(4-hydroxyphenyl)fluorene
2,7-Dihydroxypyrene
6,6'-Dihydroxy-3,3,3',3'-tetramethylspiro(bis)indane ("SBI")
3,3-Bis(4-hydroxyphenyl)phthalide
2,6-Dihydroxydibenzo-p-dioxin
2,6-Dihydroxythianthrene
2,7-Dihydroxyphenoxathiin 2,7-Dihydroxy-9,10-dimethylphenazine
3,6-Dihydroxydibenzofuran
3,6-Dihydroxydibenzothiophene
2,7-Dihydroxycarbazole.

Generally preferred, by reason of particular suitability for the purposes of this invention, are bisphenol A and spirobiindane bisphenol.

The $A^3$ value may be a divalent aliphatic, alicyclic or aromatic radical. Suitable aromatic radicals are similar to $A^1$ and $A^2$, with the proviso that they are m- or p-linked. The alicyclic radicals are similarly linked and most often contain about 4–8 carbon atoms. The $A^3$ values may be considered as being derived from a dicarboxylic acid of the formula $A^3(COOH)_2$. Thus, suitable dicarboxylic acids include adipic, pimelic and cyclohexane-1,3-dicarboxylic acids and the unsubstituted and substituted terephthalic, isophthalic and pyridine-2,6-dicarboxylic acids. The unsubstituted aromatic acids, especially isophthalic and terephthalic and most especially isophthalic acid, are preferred.

The compositions of this invention generally comprise mixtures of cyclic oligomers, principally having degrees of polymerization up to about 7. The predominant oligomer is usually the trimer.

Said compositions may be prepared by contacting, in the presence of a catalyst comprising at least one tertiary amine or quaternary ammonium salt, a di-(alkali metal) salt of a bisphenol of formula II with a dicarboxylic acid chloride of the formula

(III)

wherein $A^1$, $A^2$, $A^3$ and Y are as previously defined, under conditions of low concentration in a reaction medium comprising a substantially non-polar organic liquid. This method of preparation is another aspect of the invention.

Any suitable non-polar organic liquid may be used. The presence of alcohols and similar active hydrogen compounds therein is, of course, not suitable since they will react preferentially with the dicarboxylic acid chloride. The identity of the liquid is otherwise not critical. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform, methylene chloride, trichloroethane and tetrachloroethane; and mixtures of the foregoing with ethers such as tetrahydrofuran.

To prepare the cyclic oligomer composition according to the above-described method, the reagents are maintained in contact under conditions of low concentration. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method each reagent is added gradually to a reaction vessel containing said organic liquid.

It is within the scope of the invention to add the bisphenol di-(alkali metal) salt as a solid, but this is frequently inconvenient. It is preferably added as an aqueous solution. Substantially equimolar proportions of bisphenol salt and dicarboxylic acid chloride should be employed.

The reaction is conducted in the presence of a catalyst comprising at least one tertiary amine or quaternary ammonium salt. It is generally employed in the amount of about 0.1–5.0 mole percent based on bisphenol.

Suitable tertiary amines include aliphatic amines such as triethylamine, tri-n-propylamine, diethyl-n-propylamine and tri-n-butylamine and heterocyclic amines such as pyridine and 4-dimethylaminopyridine (the latter, for the purposes of this invention, containing only one active amine group). Triethylamine is generally preferred by reason of its availability and particular suitability.

In general, the quaternary ammonium salts are somewhat preferred over the tertiary amines. This is particularly true when the bisphenol salt is added as an aqueous solution, since quaternary ammonium salts are capable of functioning as phase transfer catalysts to facilitate the reaction. Illustrative quaternary ammonium salts are the tetraalkylammonium halides containing a total of about 15–30 carbon atoms, examples of which are tetra-n-butylammonium bromide and methyltrioctylammonium chloride.

The reaction temperature is generally in the range of about 25°–100° C. Higher temperatures within this range, typically about 50°–100° C., frequently increase the yield of cyclics.

When the above-described process of preparation is conducted with most bisphenols, the desired cyclic polyester oligomers are generally obtained in admixture with a substantial proportion of insoluble by-products, probably chiefly linear polyesters of various molecular weights. The cyclics themselves are soluble in such solvents as methylene chloride and may be isolated therefrom by conventional means such as evaporation or precipitation with a non-solvent such as tetrahydrofuran.

It has been found that spirobiindane bisphenols (SBI and substituted analogs thereof) are particularly susceptible to the preparation of cyclic products in relatively high yield. This is probably a result of their molecular structure, in which the hydroxy groups are much closer together than in other bisphenols and the molecule has an essentially curved configuration.

For this reason, a somewhat simpler procedure can be employed for the preparation of cyclic polyester oligomers from spirobiindane bisphenols of the formula

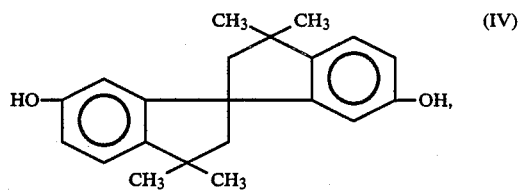

(IV)

wherein each R is independently $C_{1-4}$ primary or secondary alkyl or halo and n is from 0 to 3. It is possible to merely add the dicarboxylic acid chloride to a mixture of the aforementioned organic liquid and an aqueous solution of the spirobiindane bisphenol di-(alkali metal) salt, the latter being maintained in low concentration, in the presence of catalyst which is preferably also in admixture with said spirobiindane bisphenol salt. Reaction temperatures in the range of about 25°–100° C. and especially about 30°–50° C. are typical. This method is another aspect of the invention.

The preparation of the cyclic polyester oligomers of this invention is illustrated by the following examples.

EXAMPLES 1-7

Solutions of catalyst in 75 ml. of various solvents were prepared. There were simultaneously added thereto a solution of 10.15 grams (50 mmol.) of isophthaloyl chloride in 50 ml. of the same solvent and 50 mmol. of the disodium salt of bisphenol A, as a 1M aqueous solution. The addition time was 30 minutes, and the reaction mixture was stirred during that time and for an additional 5 minutes. The reaction mixtures were separated into liquid and solid phases and the liquid phase was washed twice with dilute aqueous hydrochloric acid, after which the desired cyclic polyarylate oligomers were isolated by solvent stripping, redissolution in methylene chloride and repeated stripping, or by precipitation of the polymer with tetrahydrofuran followed by solvent stripping. Upon analysis by high pressure liquid chromatography, the products were found to contain oligomers with degrees of polymerization from 2 to about 7, with the cyclic trimer being the predominant species.

The relevant parameters and percentage yields of cyclics are listed in the following table.

| Example | Catalyst Identity | Conc., mole % | Solvent | Temperature, °C. | Yield of cyclics |
|---|---|---|---|---|---|
| 1 | Triethylamine | 0.4 | Methylene chloride | 25 | 15 |
| 2 | Methyltrioctyl-ammonium chloride | 0.2 | Methylene chloride | 25 | 25 |
| 3 | Methyltrioctyl-ammonium chloride | 0.2 | Methylene chloride | 40 | 35 |
| 4 | Methyltrioctyl-ammonium chloride | 0.1 | Chloroform | 61 | 50 |
| 5 | Methyltrioctyl-ammonium chloride | 0.2 | 1,1,1-Tri-chloroethane | 80 | 35 |
| 6 | Methyltrioctyl-ammonium chloride | 0.2 | 1,1,2,2-Tetra-chloroethane | 80 | 35 |
| 7 | Tetra-n-butylam-monium chloride | 0.2 | Chloroform | 61 | 40 |

EXAMPLE 8

The procedure of Example 3 was repeated, substituting adipoyl chloride for the isophthaloyl chloride on an equimolar basis. The desired cyclic bisphenol A adipate oligomer composition was obtained in approximately 30% yield.

EXAMPLE 9

A mixture of 31.7 grams (100 mmol.) of SBI hemihydrate, 50 ml. of 5M aqueous sodium hydroxide solution (250 mmol.), 645 mg. (2 mmol.) of tetra-n-butylammonium bromide and 200 ml. of methylene chloride was heated under reflux and 100 ml. of a 1M solution of isophthaloyl chloride in methylene chloride was added over 30 minutes. After the addition was complete, refluxing was continued for 5 minutes. The aqueous and organic phases were separated and the aqueous phase was extracted with methylene chloride; the extracts were combined with the organic phase and washed with aqueous hydrochloric acid solution, aqueous sodium chloride solution and water. Upon evaporation of the methylene chloride, there was obtained a product which was found by high pressure liquid chromatographic analysis to contain 85% cyclic polyarylate oligomers and 15% linear polymer. The identities of the oligomers were confirmed by infrared and nuclear magnetic resonance spectroscopy.

EXAMPLE 10

The procedure of Example 9 was repeated, substituting terephthaloyl chloride on an equimolar basis for the isophthaloyl chloride. A product was obtained which comprised 50% cyclic polyarylate oligomers and 50% linear polyarylate.

The cyclic polyester oligomers of this invention may be polymerized to linear polyesters. Polymerization is normally achieved by contacting the cyclic oligomer composition with a transesterification catalyst at a temperature in the range of about 200°–300° C. This method is another aspect of the invention.

Compounds useful as catalysts include those known in the art to be useful for the preparation of linear polyesters from dihydroxy compounds and alkyl dicarboxylates. These include basic compounds such as lithium hydroxide, lithium phenoxide and sodium phenoxide. Also useful are various Lewis acids, especially tetraalkyl titanates such as tetraethyl, tetrabutyl and tetraoctyl titanate. The amount of catalyst used is generally in the range of about 0.1–1.5 mole percent based on structural units in the cyclic polyarylate oligomers. The polymerization reaction is typically carried out in the melt, although solution polymerization in such high boiling solvents as 2,4-dichlorotoluene or 1,2,4-trichlorobenzene are also contemplated, as is solution polymerization in more volatile solvents under pressure.

As previously mentioned, the cyclic polyester oligomers of this invention are also capable of copolymerization with cyclic polycarbonate oligomers. Depending on the mode of polymerization, there may be obtained random or block copolyestercarbonates.

The polymerization of the cyclic polyarylate oligomer compositions of this invention is illustrated by the following examples.

EXAMPLE 11

To a solution of 0.5 gram of cyclic bisphenol A isophthalate oligomer in 15 ml. of methylene chloride was added 1.5 mg. of tetrabutyl titanate. The solution was agitated thoroughly and the methylene chloride was removed by evaporation. The residue was heated for 45 minutes under nitrogen at 285° C., whereupon there was obtained a linear polyarylate insoluble in methylene chloride. Upon extraction of low molecular weight polymer with tetrahydrofuran, a high molecular weight material having a glass transition temperature of 173° C. was obtained.

EXAMPLE 12

Following the procedure of Example 11, cyclic SBI isophthalate was polymerized. The high molecular weight linear polyarylate had a glass transition temperature of 243° C.

What is claimed is:

1. A method for preparing a linear polyester which comprises contacting with a transesterification catalyst, at a temperature in the range of about 200°–300° C., a composition comprising cyclic polyester oligomers of the formula

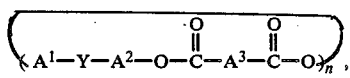
(I)

wherein each of $A^1$ and $A^2$ is a monocyclic divalent aromatic radical, $A^3$ is a divalent aliphatic or m- or p-linked monocyclic aromatic or alicyclic radical, Y is a single bond or Y is a divalent bridging group and n is from 2 to about 7.

2. A method according to claim 1 wherein the transesterification catalyst is a tetraalkyl titanate.

3. A method according to claim 2 wherein $A^3$ is aromatic.

4. A method according to claim 3 wherein $A^3$ is m-phenylene.

5. A method according to claim 4 wherein $A^1$ and $A^2$ are each p-phenylene and Y is isopropylidene.

6. A method for preparing a linear polyester which comprises contacting with a transesterification catalyst, at a temperature in the range of about 200°–300° C., a composition comprising cyclic polyester oligomers of the formula

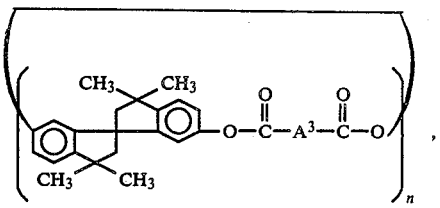

wherein $A^3$ is m- or p-phenylene and n is from 2 to about 7.

7. A method according to claim 6 wherein the transesterification catalyst is a tetraalkyl titanate.

8. A method according to claim 7 wherein $A^3$ is m-phenylene.

9. A method according to claim 7 wherein $A^3$ is p-phenylene.

* * * * *

UNITED STATES PATENT AND TRADEMARK OFFICE
CERTIFICATE OF CORRECTION

PATENT NO. : 4,757,132
DATED : July 12, 1988
INVENTOR(S) : Daniel J. Brunelle and Thomas G. Shannon It is certified that error appears in the above-identified patent and that said Letters Patent is hereby corrected as shown below:

Column 1, lines 44-45, "containing structural units" should be deleted.

Signed and Sealed this

Twenty-first Day of February, 1989

Attest:

DONALD J. QUIGG

Attesting Officer

Commissioner of Patents and Trademarks